Figure 1:
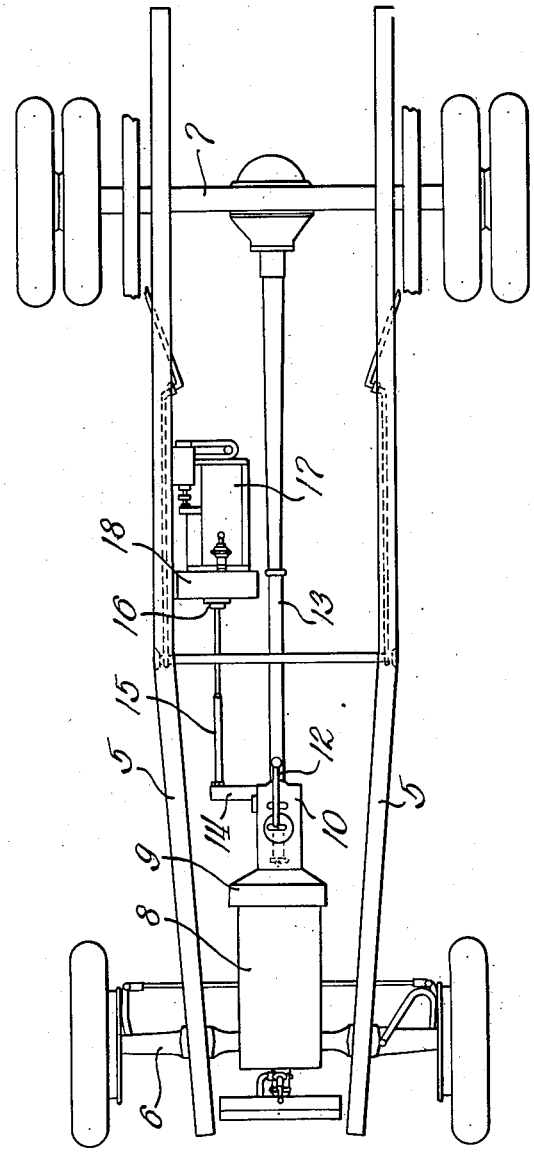

June 14, 1949.  R. E. BURRUS  2,472,789
VEHICLE CLUTCH CONTROL MECHANISM
Filed July 16, 1945  2 Sheets-Sheet 1

INVENTOR.
Robert E. Burrus
BY Walter E. Schirmer
Atty.

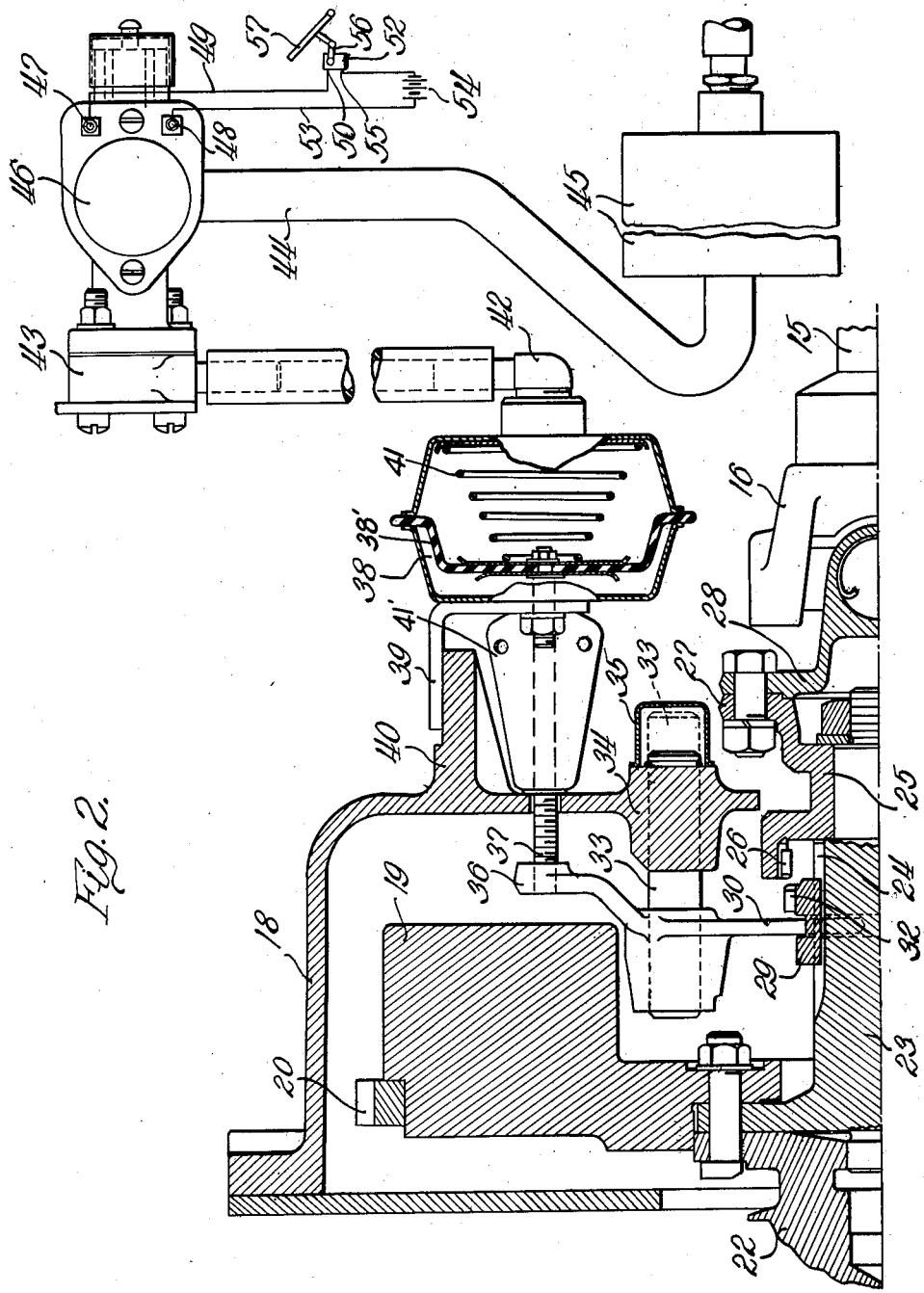

Patented June 14, 1949

2,472,789

UNITED STATES PATENT OFFICE 2,472,789

VEHICLE CLUTCH CONTROL MECHANISM

Robert E. Burrus, Buchanan, Mich., assignor to Clark Equipment Company, Buchanan, Mich., a corporation of Michigan Application July 16, 1945, Serial No. 605,236

8 Claims. (Cl. 192—.07)

This invention relates to vehicle clutch control mechanisms, and more particularly is concerned with such a mechanism embodied in a vehicle of the type having an auxiliary or supplemental engine used for providing added torque when the vehicle is climbing grades or when additional acceleration is required. A vehicle of this type having a booster engine unit is described in the co-pending application of Donald D. Ormsby, Serial No. 256,947, filed February 17, 1939, which has issued as Patent No. 2,419,911, dated April 29, 1947, and in general, the present invention constitutes a modification of that construction to the extent of providing means for relieving the lay shaft between the auxiliary engine and the transmission of stresses produced when the vehicle is stopped, and has a tendency to roll backward while in gear. Due to the direct connection of the lay shaft into the countershaft of the transmission of vehicles of this type, any tendency of the vehicle to roll rearwardly when the transmission has not been shifted to neutral produces a reverse rotation of the lay shaft, backing the transmission up against the compression of the auxiliary engine to a point where it is impossible to shift gears when it is again desired to start the vehicle.

The present invention has as one of its primary objects the provision of means providing for declutching the auxiliary engine from the lay shaft whenever the auxiliary engine is cut out entirely. This thereby disconnects the lay shaft from the auxiliary engine so that any tendency of the vehicle to roll rearwardly will not produce a back compression in the auxiliary engine, tending to over stress the gears so that they cannot be shifted by the operator.

A still further object of the present invention is to provide a sliding clutch mechanism interposed between the flywheel driveshaft and the universal joint connection to the lay shaft of the booster engine, which clutch is connected through a vacuum system and a throttle control mechanism in such manner that it is held in engaged position by vacuum only when the main engine is operating above idling speed. Suitable throttle means at the main engine opens the vacuum line whenever the throttle reaches idling position, and spring means then operates to disengage the clutch mechanism for disconnecting the auxiliary engine from the lay shaft.

Still another object of the present invention is to provide a control mechanism of this sort which is entirely automatic in operation and requires no control on the part of the operator, so that it will function independently of the operator at all times that conditions arise requiring shifting of the disconnect clutch. However, the control means can be made manually operable, if so desired, by using either the ignition switch of the auxiliary engine or a manual cut-out switch.

Other objects and advantages of the present invention will become more apparent to those skilled in the art from the following detailed description which, taken in conjunction with the accompanying drawings, will disclose a particular construction and operation of the preferred form of the present invention.

In the drawings:

Figure 1 is a plan view of a vehicle and chassis embodying the present construction; and Figure 2 is a detail view, partly in section, showing the clutch mechanism and control therefor.

Referring now in detail to Figure 1, I have provided a vehicle chassis including the side rails 5, a front axle 6, and a rear driving axle 7.

Mounted between the side rails 5 at the forward portion of the vehicle is a conventional engine 8 which, through the bell housing 9 is connected to a transmission 10 having the gear shift lever 12 for controlling the various speed ratios within the transmission. From the rear end of the transmission 10 there is extended a propeller shaft 13 by which torque from the transmission is transferred to the driving axle 7. Thus far, the vehicle is of conventional design.

Mounted on one side of the transmission and projecting laterally therefrom is a power take-off housing 14 having suitable gears connected into the idler shaft of the transmission, and to a lay shaft 15 which extends parallel to the propeller shaft 13 and at its opposite end is connected through the universal joint 16 to the output shaft of the auxiliary engine 17. The engine 17 is preferably mounted immediately within one of the side rails 5 between the side rail and the propeller shaft 13, and faces oppositely to the direction of the engine 8. It is supported in any suitable manner from the side rail and from a suitable cross frame member, and is provided with the flywheel housing 18 shown more in detail in Figure 2. Within the flywheel housing 18 there is disposed the flywheel 19 having the starter gear 20 and provided adjacent its hub portion with means for connecting the crankshaft 22 to the output shaft 23. The output shaft 23 in turn is provided with a splined portion 24 and carries thereon a rotatable sleeve member 25 having offset internal clutch teeth 26.

The opposite end of the sleeve member 25 is provided with a radial flange portion 27 to which is bolted a companion flange 28 of a universal joint assembly indicated generally at 16.

It will be noted that there is thus provided an independent connection of the shaft 23 with the shaft 15 through the internal clutch teeth 26 of the sleeve 25, and the sliding clutch gear 29 adapted to receive the shifter fork 30. The clutch member 29 is provided with external clutch teeth 32 adapted, when shifted to the right as viewed in Figure 2, to mesh with clutch teeth 26 to provide a driving connection from the shaft 23 to the shaft 15.

The shifter fork 30 is fixed upon a sliding rail 33 mounted in a suitable box 34 in the end wall of the flywheel housing 18, there being a suitable projecting cap member 35 accommodating movement of the outer end of the rail 33, as shown in dotted lines, when it is shifted into connecting position. The shifter fork 30 is also provided with an upstanding arm 36 in which is engaged the projecting rod 37 extending into a vacuum control member 38 having a diaphragm 38' which may be of the differential pressure diaphragm type, that is, containing a diaphragm subject to atmospheric pressure on one side and sub-atmospheric pressure on the other side and which is supported by the bracket 39 upon an extension 40 of the flywheel housing. The pull rod 37, when the member 38' is subjected to vacuum, is retracted in position, causing engagement of clutch teeth 32 and 26. When the vacuum is relieved in member 38, suitable spring means 41 within this member forces the pull rod 37 outwardly, thereby shifting the fork 30 to disengage the clutch. A rubber dust boot 41' is provided over the rod 37 and is apertured as indicated to allow atmospheric pressure on the side of the diaphragm 38' opposite the spring means 41.

The member 38 is provided with a vacuum connection 42 leading into a vacuum control member 43, which in turn is connected through the vacuum line 44 with a suitable source of vacuum, such as the vacuum tank 45 carried by a truck of this type, and which may be employed also in connection with vacuum brakes or the like. Interposed between the vacuum control member 43 and the line 44 is an electric control member 46 having terminals 47 and 48. The terminal 47 is connected through conductor 49 to one terminal 50 of an accelerator pedal control switch 52. The terminal 48 is connected through line 53 to one side of a battery or power source 54, the other side of which is connected to the terminal 55 of the accelerator pedal control switch. A suitable switch arm 56 is provided which is pivotally connected with the accelerator pedal 57 so that upon depression of the accelerator pedal 57, the switch 52 is energized to complete a circuit between terminals 47 and 48. This in turn opens the vacuum connection from line 44 through control member 43 to the control diaphragm 38', thereby pulling rod 37 to the right against the pressure of spring 41 and engaging the clutch mechanism. The control member 46 is provided with an atmospheric breather connection 51 to admit air into line 42 when switch 52 is deenergized.

Thus, whenever the accelerator for the main engine is depressed, the vacuum connection operates to connect the lay shaft 15 with the output shaft with the auxiliary engine 17. However, when the accelerator pedal 57 is released to idling position, the arm 56 actuates switch 52 in such manner as to open the circuit between the terminals 47 and 48, thereby opening the vacuum line so that no vacuum exists in the control 38. As a result, the spring means within this member function to force the rod 37 outwardly, thereby disengaging the clutch to disengage the shaft 15 from the output shaft 23, thereby allowing the vehicle to roll rearwardly without building up any compression within the auxiliary engine 17.

It will be noted that the control circuit is shown only diagrammatically, and its is obvious that other types of control may be employed for this purpose if so desired.

It is therefore believed apparent that I have provided a simple, easily installed automatic clutch mechanism for control of the connection between the lay shaft and the auxiliary engine which is entirely independent of any control on the part of the operator, except insofar as his normal operation of the accelerator pedal is concerned.

I therefore do not expect to be limited except as defined by the scope and spirit of the appended claims.

I claim:

1. In a vehicle, a main engine, having an accelerator, an auxiliary engine, a transmission coupled to said main engine, a lay shaft connecting said auxiliary engine into said transmission, clutch means between said auxiliary engine and said lay shaft, and means responsive to movement of said accelerator to an idling position of said main engine for disconnecting said clutch means.

2. In a vehicle having a main engine, speed controlling means therefor, and a transmission, an auxiliary engine, means including a lay shaft connecting said auxiliary engine to said transmission to supplement the torque of said main engine, clutch means between said auxiliary engine and said lay shaft, a vacuum tank, vacuum-responsive means normally connected to said tank for maintaining said clutch means engaged, control means responsive to idling position of the speed controlling means for opening said vacuum responsive means to atmosphere, and spring means in said vacuum responsive means operable thereupon to release said clutch means.

3. In combination, a vehicle having a main engine and transmission, an accelerator pedal for controlling the throttle of said main engine, an auxiliary engine, a lay shaft for connecting said auxiliary engine to said transmission, clutch means between said auxiliary engine and said lay shaft, and means controlled by said pedal for disconnecting said clutch means whenever said pedal is in idling position.

4. In a vehicle, a main engine having an accelerator, an auxiliary engine, a transmission coupled to said main engine, a lay shaft connecting said auxiliary engine to said transmission, clutch means between said auxiliary engine and said lay shaft, a vacuum system for said vehicle including an actuator for said clutch means and means controlled by said accelerator for energizing said actuator whenever said main engine accelerator is beyond idling speed position.

5. In a vehicle, a main engine having an accelerator, an auxiliary engine, a transmission coupled to said main engine, a lay shaft connecting said auxiliary engine to said transmission, clutch means between said auxiliary engine and said lay shaft, a vacuum system for said vehicle including an actuator for said clutch means and means controlled by said accelerator for deenergizing said actuator whenever said accelerator is released to idling position to thereby disengage said clutch means.

6. In a vehicle, a main engine having speed controlling means therefor, a transmission, an auxiliary engine, clutch means for coupling said auxiliary engine to said transmission, spring means normally biasing said clutch means to disengaged position, vacuum-controlled means for engaging said clutch means against the pressure of said spring means, and speed controlling means for said main engine operable when in idling position to de-energize said vacuum controlled means.

7. In a vehicle having a main engine, means for controlling the speed thereof, and a transmission, an auxiliary engine connected to the transmission of the vehicle through a lay shaft, clutch means between said lay shaft and said auxiliary engine, an actuator for said clutch means, a vacuum system for said vehicle, control means in said system normally energizing said actuator to maintain said clutch means engaged whenever said speed controlling means is operating said engine above idling speed, and means responsive to de-energization of said control means for disconnecting said clutch means.

8. The vehicle of claim 7 wherein said clutch means includes a sliding clutch member, a shifter fork therefor, and means connecting said shifter fork to said actuator.

ROBERT E. BURRUS.

REFERENCES CITED

The following references are of record in the file of this patent:

UNITED STATES PATENTS

| Number | Name | Date |
|---|---|---|
| 1,306,864 | Stoddard | June 17, 1919 |
| 1,470,272 | Belcia | Oct. 9, 1923 |
| 1,733,032 | Staniewicz | Oct. 27, 1929 |
| 2,155,434 | Marsh | Apr. 25, 1939 |
| 2,167,951 | Janicke | Aug. 1, 1939 |
| 2,213,196 | Bartholomew | Sept. 3, 1940 |
| 2,305,373 | Adamson | Dec. 15, 1942 |
| 2,384,782 | Rockwell et al. | Sept. 11, 1945 |